Jan. 19, 1926.	1,570,070
E. C. LYMAN
DEVICE FOR REMOVING TIRES OR WHEELS FROM MOTOR TRUCKS
Filed Dec. 4, 1923	2 Sheets-Sheet 1
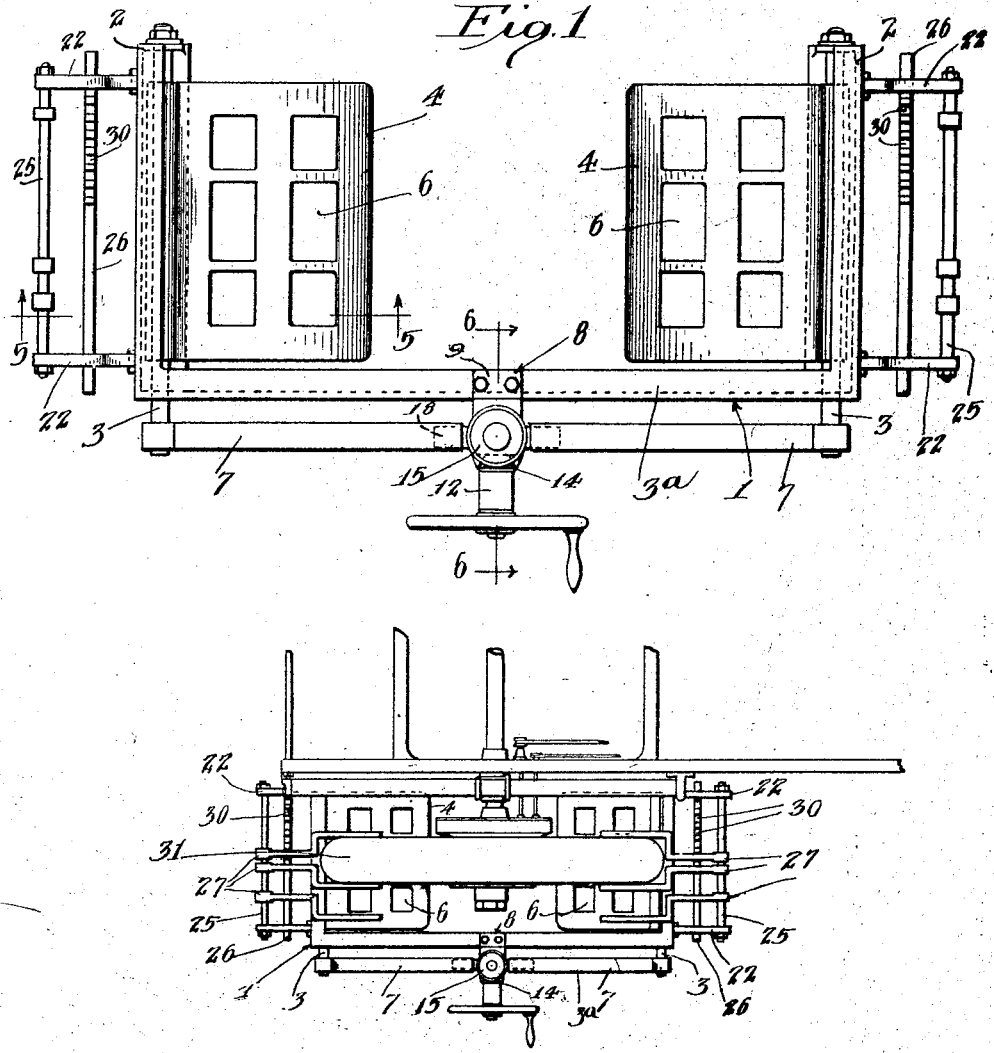
Inventor
Edgar C. Lyman
By Lyon & Lyon
Attorneys Jan. 19, 1926.　　　　　　　　　　　　　　　1,570,070
E. C. LYMAN
DEVICE FOR REMOVING TIRES OR WHEELS FROM MOTOR TRUCKS
Filed Dec. 4, 1923　　　　　2 Sheets-Sheet 2
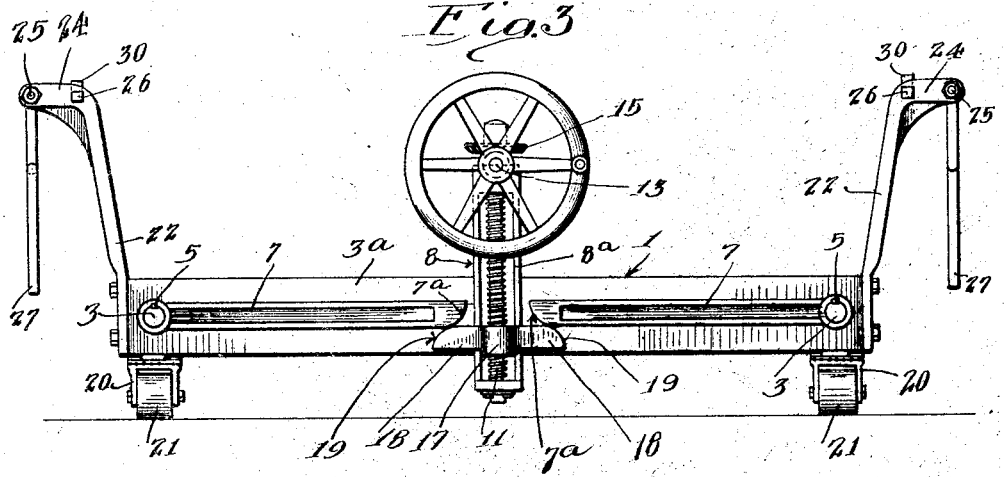
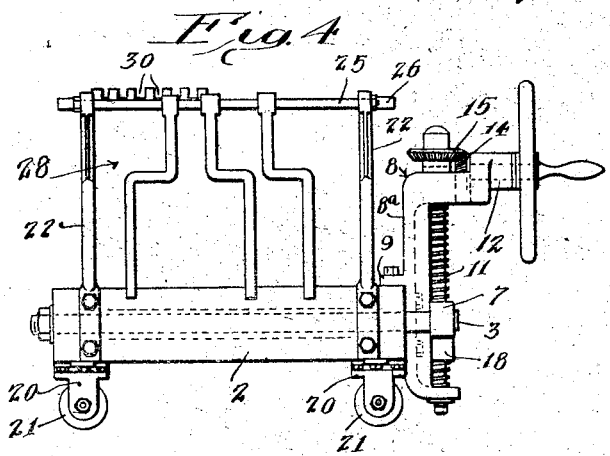
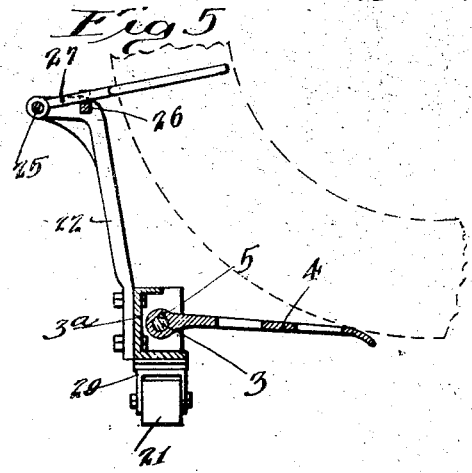
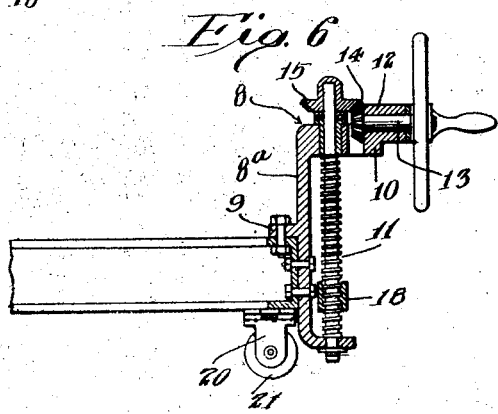
Inventor
Edgar C. Lyman
By Lyon & Lyon
Attorneys

Patented Jan. 19, 1926.

1,570,070

UNITED STATES PATENT OFFICE.

EDGAR C. LYMAN, OF BURBANK, CALIFORNIA.

DEVICE FOR REMOVING TIRES OR WHEELS FROM MOTOR TRUCKS.

Application filed December 4, 1923. Serial No. 678,381.

*To all whom it may concern:*

Be it known that I, EDGAR C. LYMAN, a citizen of the United States, residing at Burbank, in the county of Los Angeles and State of California, have invented a new and useful Device for Removing Tires or Wheels from Motor Trucks, of which the following is a specification.

This invention relates to a device adapted to remove tires or wheels from vehicles and is particularly directed to a device for removing wheels or tires from a motor truck.

The tires or wheels of a motor truck are frequently of such weight that the manual removal of the tire or wheel from the truck is extremely difficult, if not impossible, and resort is commonly made to various mechanical devices for handling the wheel or tire during its removal from the truck. Heretofore such tires or wheels have been handled through the use of hoisting tackle; or certain carriers have been employed which carriers, however, although capable of removing the tire or wheel from the truck and carrying it to a desired point, have required the use of some hoisting or lifting means to lift the tire or wheel from the carrying device when the tire is positioned upon the ground or floor and the tire or wheel repaired.

An object of this invention is to provide an improved form of device for removing the tires or wheels from a motor truck or similar vehicle, which device may readily remove the tire or wheel from the truck and carry the same to a desired position and deposit the same on the ground or the floor of a building without the necessity of lifting the tire or wheel from the device, thereby eliminating the necessity of employing hoisting tackle for that purpose.

Another object of this invention is to provide an improved means for raising and lowering the tire holding members of the device.

Another object of this invention is to provide an improved frame for carrying the tire holding means, which frame is open at one side so that the device may be slid around the tire while the same is resting upon the ground and raise the tire from the ground to a position where the tire may be transported to another locality upon the device.

Various other objects and advantages of this invention will be more fully understood from the following description of the accompanying drawings, which illustrate a preferred embodiment of the invention.

In the drawing:

Figure 1 is a plan view of a device embodying the invention.

Fig. 2 is a reduced plan view of the device illustrating a tire of a vehicle being engaged by the device.

Fig. 3 is a front elevation of Figure 1.

Fig. 4 is a side elevation of Figure 3.

Fig. 5 is a section on the line 5—5 of Figure 1.

Fig. 6 is a section on the line 6—6 of Figure 1.

Referring to the drawings, the frame of the device is generally indicated at 1. Said frame is formed in a substantially U-shape with the two opposed sections 2 joined together through a relatively long medial section 3ª so that the medial section of the frame is relatively long compared with the length of the opposed sections 2 and the frame will be in proper proportion to enclose a wheel or tire. By this construction one side of the device is open, as illustrated in Figure 1, and the device may be slid up and around a tire resting upon the ground, or a tire carried by the device may be deposited upon the ground and the device slid or rolled away from the tire.

4 indicates the tire holding members of the device which are formed of rectangular plates 4 provided with horizontally disposed apertures 6, the apertures serving to permit a flexing of the plates while the plates are engaging the tire which will aid in holding the tire upon the device. Two of such plates 4 are provided disposed between the opposed frame sections 2 and each keyed as indicated at 5 to an independent horizontal shaft 3, each shaft 3 being in turn journaled at its ends in one of the opposed frame sections 2.

The shafts 3 each extend through the medial section 3ª of the frame and are provided with a lever arm 7, the underface of the free end of which lever 7 is formed with a curving or cam like surface, as indicated at 7ª. The lever arms 7 are normally approximately horizontally disposed and extend from the shafts 3 inwardly from the shafts. At substantially the center of the medial section 3ª of the frame, a bracket 8 is bolted to the frame. The major portion 8ª of the bracket extends vertically. Said bracket 8 is provided with a lower flange 9 and an upper outwardly extending horizontal portion 10, said flange 9 and portion 10 serving to mount a rotatable worm 11, the portion 10 also provides a bearing 12 for a horizontal operating shaft 13. The shaft 13 is provided with a beveled gear 14 at its inner end which meshes with a gear 15 provided at the upper end of the worm shaft 11.

A cam member 17 is provided engaging the worm 11 and adapted to be raised or lowered by the rotation of the worm. Said member 11 is provided with opposed extensions 18, each extension engaging one of the lever arms 7 and having an upper cam like surface 19 cooperating with one of the surfaces 7ª to control the position of an arm 7 and thereby the position of a tire holding member 4.

At each corner the frame is provided with a rotatably mounted depending leg 20. Said legs each mount a roller 21, which rollers serve to support the device and permit the device to be rolled along the floor.

At each end of the sections 2 of the frame a bracket 22 is provided, the major portion of which extends upwardly and is bent slightly from the center of the device. The upper extremities 24 of the brackets 22 are bent to extend horizontally from the center of the device. Each two brackets 22, secured to the same section 2 of the frame, support an outer rod 25 and inner bar 26 at their upper horizontal extremities 24. Adjustable arms or rods 27 are loosely pivoted on the rods 25 and serve to engage the sides of the tire or wheel to be carried by the device to prevent the tire or wheel from tilting thereon. Preferably each rod 27 is provided with a bent portion 28 near their medial portion which permits the free extremities to be held closely brought together at the sides of the tire. The bar 26 provides a number of notches 30 in which the rods 27 may rest, the notches 30 may thus prevent the arms 27 sliding on the rods 25.

In operation of the device for removing a tire or wheel from a truck or other vehicle, the truck is first jacked up to free the wheel (indicated at 31 in Figure 2) from the ground. The removing device is then rolled under the tire 31, the tire entering the center of the device from the open side of the frame. By rotating the controlling wheel 16 the worm 11 will raise the cam member 17, and thereby the lever arm 7 and holding members 4, until the tire holding members 4 engage the tire 31 and remove the weight of the tire from the axis of the vehicle. The adjustable arms 27 are pivoted and engaged with opposed sides of the tire or wheel. The tire or wheel is then loosened from the vehicle and the device rolled from the vehicle carrying the tire with it. The device may then be rolled to any suitable position for working on the tire and by rotating the control wheel 16 the holder members 4 may be lowered until the tire or wheel 31 rests upon the ground. The device may then be rolled away from the tire or wheel and the tire or wheel repaired. The device may be employed for removing any number of tires or wheels in a like manner without first repairing each tire and replacing it upon the vehicle. The construction of the frame and holder members eliminates the employment of hoisting tackle and will greatly facilitate the repair work upon motor vehicles and the like.

While the particular device herein described is well suited for the purposes of this invention, this invention is not limited to the embodiment shown but the device may be modified in various manners without departing from the spirit of the invention.

This invention is of the scope set forth in the accompanying claims:

1. In a device of the class described, the combination of a substantially U-shaped frame, holding members mounted on said frame to pivot on a substantially horizontal axis and adapted to support a wheel from the ground in one position and permit the wheel to be lowered on the ground in another position, said members being in position to engage the bottom of the same in performing said operation, means for controlling the pivoting of the holding members, each of the holding members being secured solely to one side of the central opening of the frame.

2. In a device of the class described, the combination of a substantially U-shaped frame, holding members pivotally mounted on said frame and extending between the opposed sections of the U-shaped frame, means for raising and lowering the holding members, brackets carried by the frame, and adjustable rods supported by the brackets and adapted to prevent tilting of a wheel when carried by the device.

3. In a device of the class described, the combination of a substantially U-shaped frame having an open side, holding members extending between the space enclosed by the frame and pivotally mounted thereon, lever arms operably connected to the holding members, a cam engaging the lever arms, and means for raising and lowering the cam.

4. In a device of the class described, the combination of a frame, of a worm controlled cam member supported by the frame, lever arms engaging the cam member and operably connected to a shaft supported by the frame, holder arms mounted on the shaft and extending between the space enclosed by the frame, and brackets for adjustably supporting the arms in position to engage the side of an article to be carried by the device.

5. In a wheel removing device, the combination of a substantially U-shaped frame, comprising opposed side sections and a connecting medial section, a shaft supported by each opposed side section, a holding member supported by each shaft and extending partially between the side sections, means for operating the shaft, brackets carried by the side sections, and adjustable arms carried by the brackets and adapted to swing inwardly to engage opposite sides of a wheel on the device.

6. In a device of the class described, a frame having a medial section connecting two opposed side sections, a shaft carried by each opposed section, a holding member extending between the space enclosed by the frame, a lever arm fixed to each shaft, a bracket carried by the medial section and mounting a worm controlled cam member, said cam member engaging the free end of each lever arm to control the position thereof.

7. In a device of the class described, a frame shaped to enclose a central space on three sides and leave a substantially open side, holding members extending partially into the space, the holding members being mounted on the frame to pivot on a substantially horizontal axis and in position to engage the lower side of the tire, means for raising and lowering said members, each of the holding members being secured solely to one side of the central opening of the frame, the frame having rollers at the bottom adapted to support the device in upright position.

Signed at Los Angeles, California, this 6th day of June 1923.

EDGAR C. LYMAN.